(12) United States Patent
Kondou et al.

(10) Patent No.: US 7,845,661 B2
(45) Date of Patent: Dec. 7, 2010

(54) REINFORCEMENT DEVICE FOR VEHICLE

(75) Inventors: Katsuhiro Kondou, Iwata (JP); Masahiro Satou, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 657 days.

(21) Appl. No.: 11/300,167

(22) Filed: Dec. 14, 2005

(65) Prior Publication Data
US 2006/0125225 A1 Jun. 15, 2006

(30) Foreign Application Priority Data
Dec. 14, 2004 (JP) ............................. 2004-361120

(51) Int. Cl.
*B60G 13/00* (2006.01)
(52) U.S. Cl. .............................. 280/124.108; 280/784; 296/204
(58) Field of Classification Search ......... 280/124.108, 280/124.109, 782, 784; 296/204
See application file for complete search history.

(56) References Cited

U.S. PATENT DOCUMENTS

| 2,417,019 | A | * | 3/1947 | Sherman | 280/124.106 |
|---|---|---|---|---|---|
| 4,125,276 | A | * | 11/1978 | Levasseur | 280/124.108 |
| 4,279,428 | A | * | 7/1981 | Onodera | 280/124.108 |
| 5,411,311 | A | | 5/1995 | Shimmell et al. | |
| 6,007,123 | A | | 12/1999 | Schwartz et al. | |
| 6,168,228 | B1 | * | 1/2001 | Heinz et al. | 296/187.12 |
| 6,189,952 | B1 | * | 2/2001 | Schmidt et al. | 296/187.12 |
| 6,206,460 | B1 | * | 3/2001 | Seeliger et al. | 296/204 |
| 6,390,224 | B1 | * | 5/2002 | Yoshida | 180/312 |
| 6,467,836 | B1 | | 10/2002 | Miller et al. | |
| 6,595,533 | B2 | | 7/2003 | Sawai et al. | |
| 6,742,808 | B1 | * | 6/2004 | Kosak | 280/781 |
| 7,229,098 | B2 | * | 6/2007 | Mangalaramanan et al. | 280/781 |
| 7,604,247 | B2 | * | 10/2009 | Kondou | 280/124.109 |
| 7,673,904 | B2 | * | 3/2010 | Harada et al. | 280/782 |
| 7,735,909 | B2 | * | 6/2010 | Satou et al. | 296/204 |
| 2002/0153749 | A1 | * | 10/2002 | Lee | 296/204 |
| 2004/0108754 | A1 | * | 6/2004 | Igarashi et al. | 296/204 |
| 2005/0248113 | A1 | * | 11/2005 | Kiel et al. | 280/124.109 |
| 2009/0079232 | A1 | * | 3/2009 | Harada et al. | 296/203.01 |
| 2009/0167036 | A1 | * | 7/2009 | Sawai | 293/104 |

FOREIGN PATENT DOCUMENTS

| EP | 1-209-062 A2 | 5/2002 |
|---|---|---|
| EP | 1-225-119 A2 | 7/2002 |
| JP | 2002-211437 | 7/2002 |
| WO | WO 2004/104442 A1 | 12/2004 |
| WO | WO 2005/077738 A1 | 8/2005 |

OTHER PUBLICATIONS

European Search Report; Date of Mailing Apr. 5, 2006; 6 pages.
US 4,674,791, 06/1987, Harasaki (withdrawn)

* cited by examiner

*Primary Examiner*—Paul N Dickson
*Assistant Examiner*—Laura Freedman
(74) *Attorney, Agent, or Firm*—Keating & Bennett, LLP (57) ABSTRACT

A reinforcement device for a vehicle is formed in a slender shape and comprises a medial region with a hydraulic damper. The damper generates a damping force against deformation in the longitudinal direction. The longitudinal direction is defined as a lateral direction of the associated vehicle body. The reinforcement device is removably mounted at both ends to a frame of the vehicle.

5 Claims, 8 Drawing Sheets

REINFORCEMENT DEVICE FOR VEHICLE

CROSS-REFERENCE TO RELATED APPLICATIONS

The present application is based on and claims priority under 35 U.S.C. §119 Japenese Patent Application No. 2004-361120, filed on Dec. 14, 2004, the entire contents of which is expressly incorporated by reference herein.

BACKGROUND OF THE INVENTION

1. Field of the Invention

The present invention generally relates to a vibration-damping reinforcement device for a vehicle. More particularly, the present invention relates to such a reinforcement device that comprises a damping cylinder assembly.

2. Description of the Related Art

An aftermarket reinforcement member such as that disclosed in U.S. Pat. No. 5,411,311 is used to stiffen vehicle frames. These components commonly are called strut tower bars. The strut tower bar is designed to be mounted between upper portions of a body frame of the vehicle. In particular, the strut tower bar extends between the strut towers, which are positioned in the engine compartment. By joining the strut towers, the strut tower bar reinforces the body against lateral forces applied to the body from the upper ends of a front wheel suspension device.

Strut tower bars typically are coupled directly to the strut towers. Thus, any vibration originating in the strut towers is transferred directly to the chassis. For instance, when a load applied to the struts is immediately removed after the strut is compressed, a shock can be delivered to the chassis.

To reduce the degree to which such a vibration would be transmitted to the chassis, a hydraulic damper or a resilient component can be provided in the middle of the strut tower bar in the longitudinal direction, as shown in Japanese Application No. 2002-211437 or U.S. Pat. No. 6,595,533.

SUMMARY OF THE INVENTION

However, because the engine compartment has little available space for reinforcing components and because the hood height is limited, mounting the reinforcing components within the engine compartment can be problematic. In addition, because the reinforcing components extend across the upper portion of the engine compartment, servicing the engine and other equipment positioned in the engine compartment can be difficult without removing the reinforcing components.

In some configurations, reinforcing members have been provided that extend side-to-side within the passenger compartment, or cabin, of the associated automobile. Such a configuration, however, is unsightly and reduces the available leg room for passengers.

Accordingly, one aspect of the present invention involves providing a reinforcement device for a vehicle, which device can easily improve the handling of the vehicle. The device preferably can be attached without a significant change in the body structure of the existing vehicle and without decreasing the serviceability of the engine or reducing the leg room of vehicle occupants.

Another aspect of the present invention involves a reinforcement device for a vehicle. The reinforcement device comprises an elongated profile defined between a first end and a second end. A hydraulic damping force generation component is positioned between the first end and the second end. The hydraulic damping force generation component resists movement tending to separate or to bring together the first and second ends. The first end and the second end are adapted for removable mounting to an underside of the vehicle in a transverse orientation relative to the vehicle.

A further aspect of the present invention involves a reinforcement device for a vehicle. The reinforcement device comprises an elongated profile that is defined between a first end and a second end. A hydraulic damping force generation component is positioned between the first end and the second end. The hydraulic damping force generation component resists movement tending to separate or to bring together the first and second ends. The first end and the second end are adapted for removable mounting to a bumper reinforcement mounting portion of the vehicle in a transverse orientation relative to the vehicle.

One aspect of the present invention involves a vehicle comprising a frame. The frame comprises a first side rail and a second side rail with a cross member extending between the first side rail and the second side rail. The frame also comprises an underside, a rear side and a front side. A reinforcing member is positioned on at least one of the underside, the rear side and the front side. The reinforcing member extends in the same general direction as the cross member. The reinforcing member comprises a first end portion and a second end portion with the first end portion being removably connected to the frame and the second end portion being removably connected to the frame. The reinforcing member also comprises a damper disposed between the first end portion and the second end portion. The reinforcing member defines an axial direction between the first end portion and the second end portion with the damper resisting relative movement of the first and second end portions in the axial direction.

An additional aspect of the present invention involves a vehicle comprising a frame, an engine compartment and passenger compartment. The frame comprises a first side rail and a second side rail. A cross member extends between the first side rail and the second side rail. The frame also comprises an underside, a rear side and a front side. A reinforcing member is positioned outside of the engine compartment and the passenger compartment. The reinforcing member extends in the same general direction as the cross member. The reinforcing member comprises a first end portion and a second end portion with the first end portion being removably connected to the frame and the second end portion being removably connected to the frame. The reinforcing member also comprises a damper disposed between the first end portion and the second end portion and defining an axial direction between the first end portion and the second end portion. The damper resists relative movement of the first and second end portions in the axial direction.

BRIEF DESCRIPTION OF THE DRAWINGS

These and other features, aspects and advantages of the present invention now will be described in connection with several preferred embodiments of the invention and by reference to the accompanying drawings. The illustrated embodiments, however, are merely examples and are not intended to limit the invention. The drawings include the following eight figures.

DETAILED DESCRIPTION OF THE PREFERRED EMBODIMENT

Figure 1:
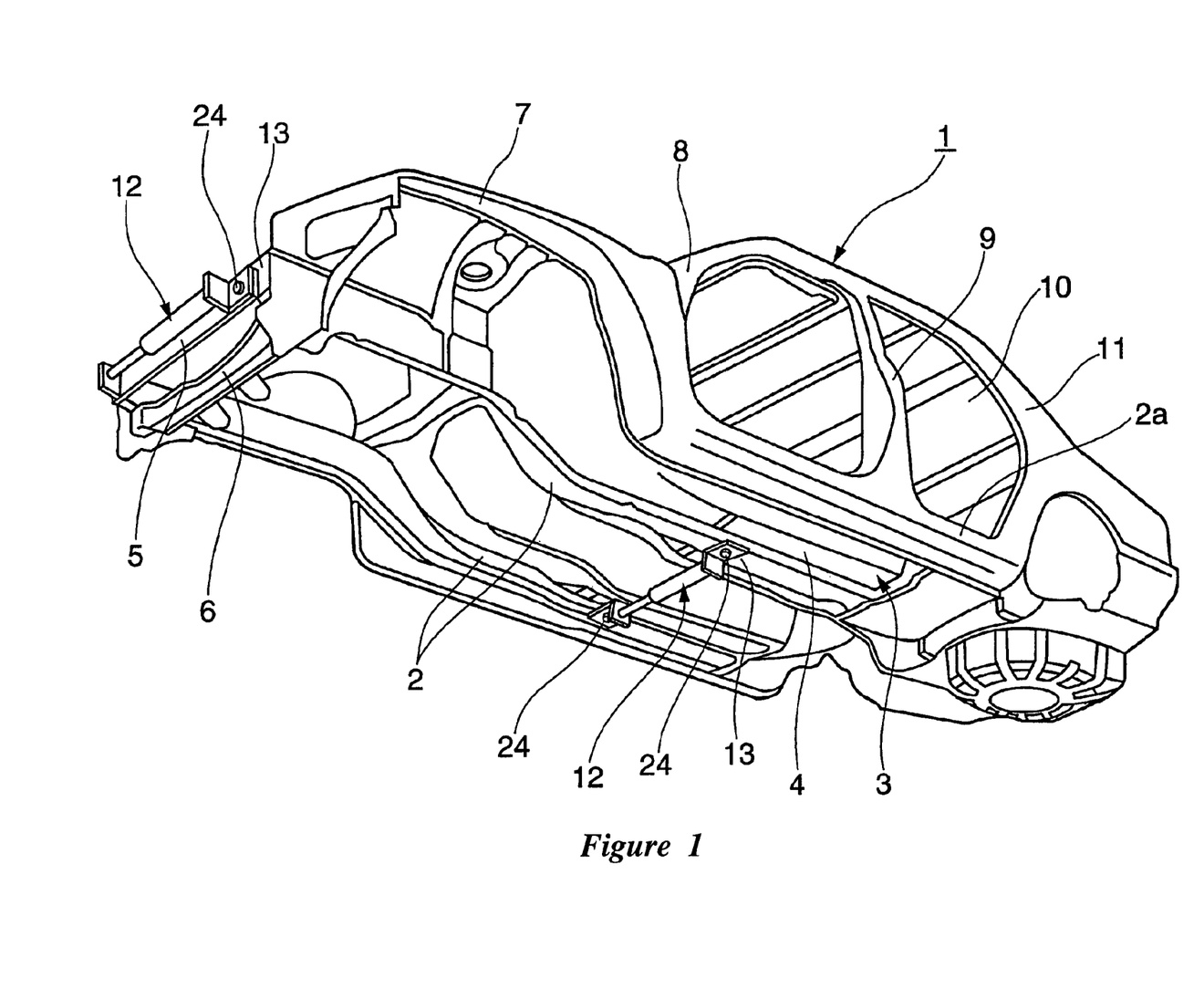
FIG. 1 is a perspective view of a body frame equipped with a reinforcement device that is arranged and configured in accordance with certain features, aspects and advantages of the present invention.

With reference now to FIG. 1, a body frame 1 is illustrated therein. The frame 1 preferably is formed as a monocoque body or a unibody construction. The monocoque body 1 typically is formed of a plurality of pressed plates or pipes that are assembled together and welded or bolted into position. In some applications, however, the frame 1 can be formed as a body-on-frame style or a partial monocoque body with a subframe. Other frame configurations also can be used.

The frame 1 preferably comprises two side frame rails 2. The illustrated side frame rails 2 extend in a longitudinal direction of the vehicle and are spaced in a transverse direction of the vehicle. More preferably, the side frame rails 2 extend along the two lateral sides of the vehicle. The illustrated frame 1 also comprises a floor panel 4 that, together with these side frame rails 2, defines an undercarriage or under body 3.

As illustrated, a bumper reinforcement 5 can be disposed toward an end of the vehicle. In the illustrated configuration, the bumper reinforcement 5 is a front bumper reinforcement and is positioned to a forward end of the vehicle. Other configurations are possible. The bumper reinforcement 5 may be welded at the forward ends of the side frames 2, 2. The bumper reinforcement 5 can be formed by an extruded material made of aluminum alloy or a channel made of aluminum alloy or ferrous alloy.

In the illustrated configuration, the frame 1 further comprises a cross member 6 that extends transversely between the side frame rails 2. The cross member 6 can be positioned in any suitable location but is shown at the forward end of the side frame rails 2.

The illustrated frame 1 also comprises a front fender apron 7, an A or front pillar 8, a B or center pillar 9, a roof 10, a C or rear pillar 11 and a side shell 2a. Other components also can be provided to the frame, if desired.

In the illustrated configuration, reinforcement devices 12 can be mounted in suitable locations outside of the engine compartment and the passenger compartment. For instance, as illustrated in FIG. 1, the reinforcement devices 12 can be mounted between the side frames 2 and/or proximate the bumper reinforcement 5. In one configuration, the reinforcement devices 12 can be mounted to the mounting assemblies of the bumper reinforcement 5. Preferably, the reinforcement devices are removably mounted such that they can be coupled to or uncoupled from the frame 1. The reinforcement devices increase the lateral stiffness of the associated vehicle.

Figure 2:
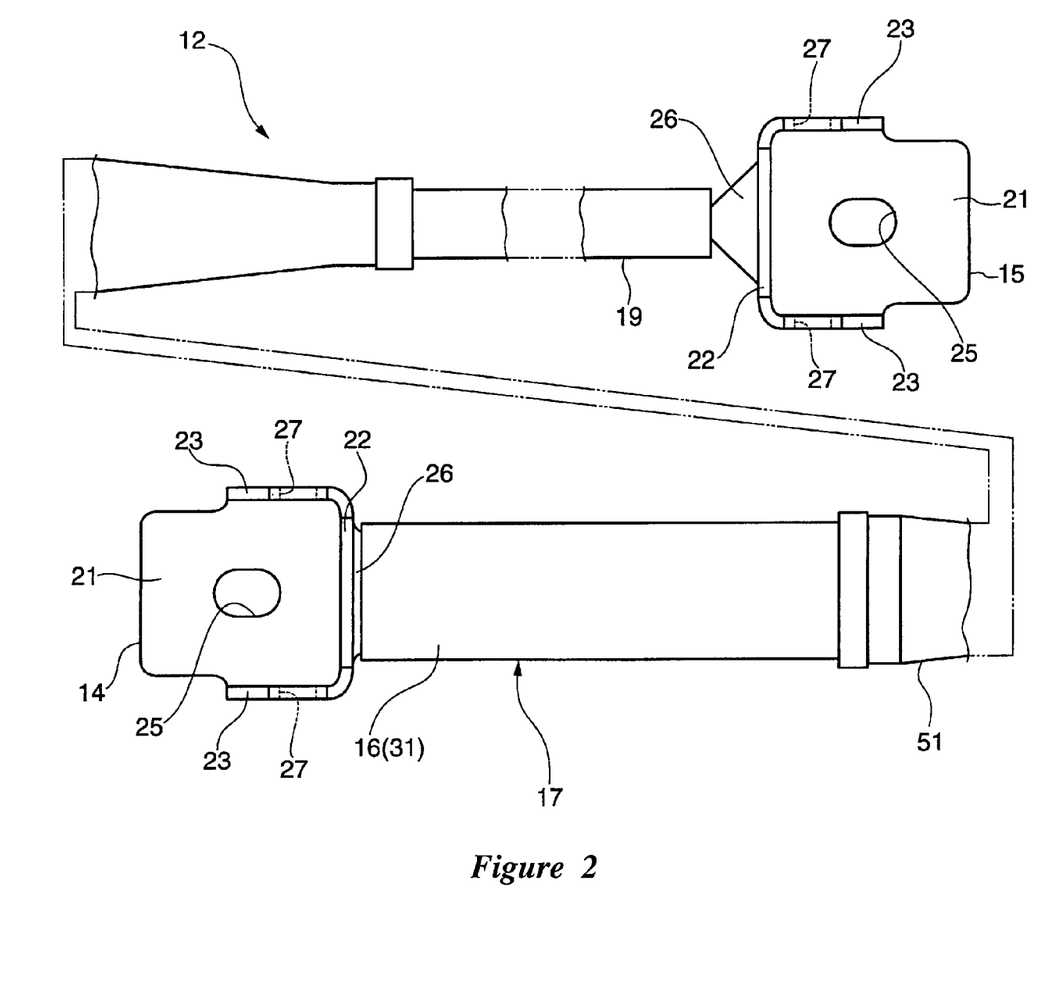
FIG. 2 is a plan view of the reinforcement device of FIG. 1.

With reference now to FIG. 2, the reinforcement devices 12 preferably are formed to have a fairly slender shape. The devices also desired to be expandable. In the preferred configuration, when attached to the frame 1, the reinforcement devices 12 are expandable in the lateral direction of the body, such as shown in FIG. 1.

Mounting seats 13 can be defined along the side frame rails 2 such that the reinforcement device 12 can be removably coupled to the mounting seats 13. The mounting seats 13 can be secured to the side frame rails 2 in any suitable manner. In some configurations, the mounting seats 13 are integrally formed with the frame 1. The mounts preferably have approximately the same elevation as the bottom surface of the floor panel 4. In such a configuration, the mounting seats 13 will depend downward to about the same degree as the floor panel 4. Preferably, the mounting seats 13 are configured such that they can be assembled to the frame 1 even after production of the associated vehicle has been completed (i.e., the mounting seats can be configured as a portion of an aftermarket product).

The mounting seat 13 preferably comprises a generally flat surface for mounting the reinforcement device 12 to the frame 1. The illustrated mounting seat 13 comprises a portion of each side frame rail 2, although other configurations also are possible. In some configurations, the mounting seat 13 can comprise a nut (not show) embedded in the generally flat surface. In more advantageous configurations, the mounting seat 13 can comprise a nut or other threaded member that is embedded in the associated component of the vehicle or frame 1, such as the side frame rails 2 or the bumper reinforcement 5, for instance but without limitation. The mounting seat 13 therefore can be considered a mounting portion associated with the body frame 1 or the mounting seat 13 can be considered a mounting portion associated with the bumper reinforcement, for instance, depending upon the location.

An example is shown in which the reinforcement device 12 is mounted to the bumper reinforcement mounting portions (on the mounting seats 13) and the reinforcement device 12 is fastened together with the bumper reinforcement 5 to the mounting seats 13. In some configurations, the bumper reinforcement 5 can be welded to the mounting seats 13 and the reinforcement device 12 can be mounted for attachment to or detachment from the bumper reinforcement 5 on the front face or the bottom surface. In any event, the bumper reinforcement 5 preferably is housed inside a bumper (not shown) together with the reinforcement device 12, if the reinforcement device 12 is installed.

Figure 3:
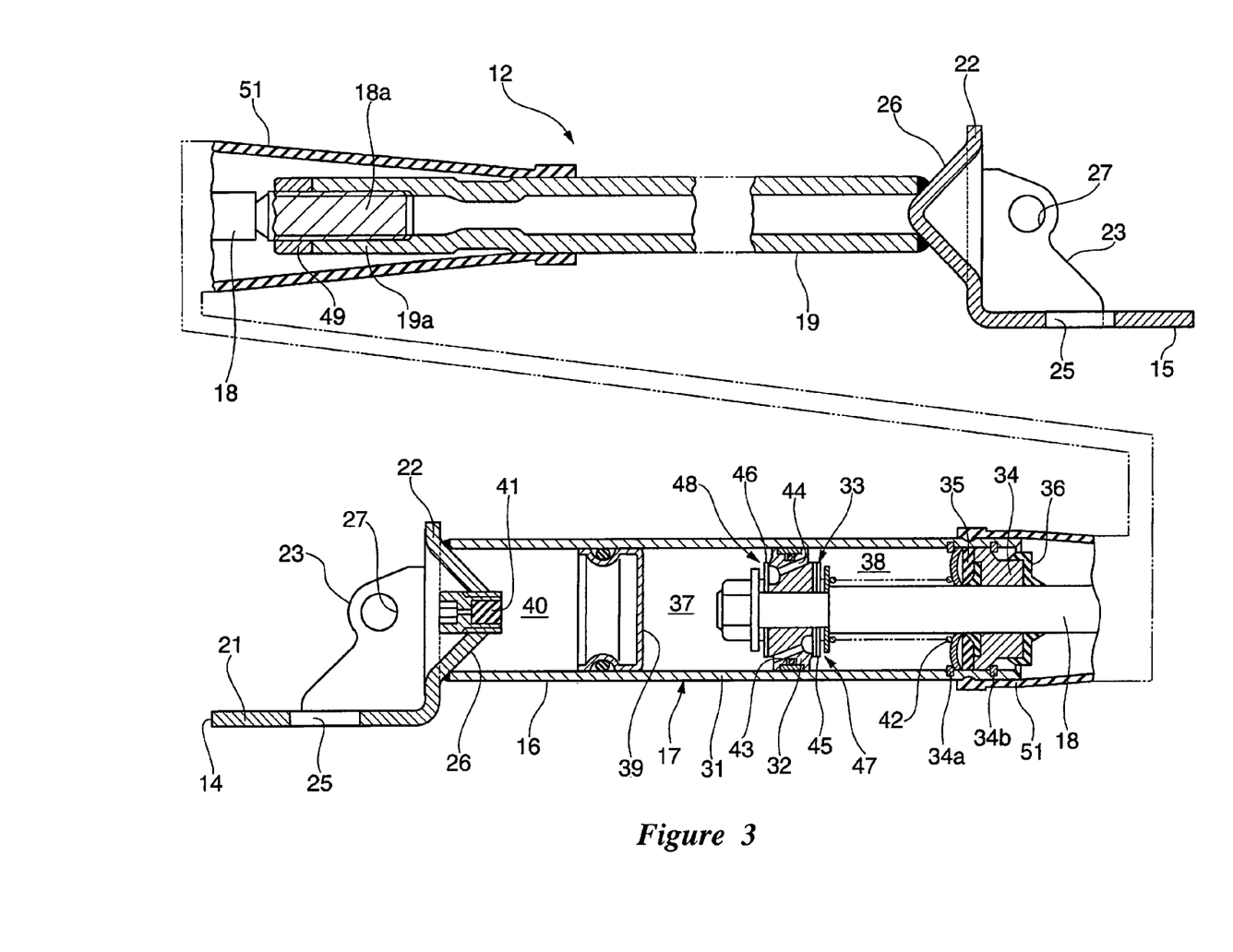
FIG. 3 is a vertical sectional view of the reinforcement device of FIG. 1.

With reference now to FIG. 2 and FIG. 3, the illustrated reinforcement device 12 comprises first and second mounting members 14, 15. The mounting members 14, 15 preferably are positioned at lateral ends of the reinforcement device 12. A hydraulic damper 17, which preferably comprises a hydraulic cylinder 16, can be secured to the first mounting member 14 while an extension rod 19, which is preferably connected to a piston rod 18 of the hydraulic damper 17, is secured to the other mounting member 15. In a preferred configuration, the hydraulic damper is welded to the mounting members 14, 15. Other suitable configurations also can be used. For example but without limitation, the mounting members 14, 15 can be secured to the hydraulic damper 17 with threaded coupling members or with a pinned coupling.

In the illustrated configuration, the mounting members 14, 15 each is has a generally L-shaped configuration. Other suitable configurations also can be used. The illustrated mounting members 14, 15 can comprise a bent steel plate. In some configurations, the mounting members 14, 15 can be formed of an extruded member, such as a piece of angle material, or can be formed by casting or forging.

The illustrated mounting members 14, 15 preferably each comprises a mounting plate 21. A support plate 22 preferably extends from one end of the mounting plate 21 with a pair of reinforcement ribs 23 connecting the sides of the support plates 22 to the mounting plate 21. In other words, the reinforcement ribs 23 preferably define gussets that support the support plate 22 and the mounting plate 21.

In the illustrated configuration, the mounting plate 21 is formed with a hole 25 that accepts a mounting bolt 24 (see FIG. 1). The mounting bolt 24 is used to couple the mounting member 14, 15 is to the frame 1. The hole 25 advantageously is formed as an elongated slot, as shown in FIG. 2. In other words, the hole 25 is elongated in the axial direction of the damper 17. In the illustrated configuration, the elongated holes 25 allow some tolerance in the mounting locations defined by the mounting seats 13.

With continued reference to FIG. 2, the illustrated support plate 22 comprises a welding base 26. The base 26 preferably is formed by bending the support plate 22 outward into a generally conical shape. Other shapes also can be used; however, the conical shape of the base 26 advantageously reduces the stresses between the base 26 and the support plate 22. As mentioned above, the support plate 22 need not be welded to the damper 17 but can be connected in any suitable manner.

With reference to FIG. 3, the reinforcement rib 23 preferably comprises a mounting hole 27. The mounting hole 27 can be used to mount a damping force measuring instrument. Other suitable instrument mounting configurations can be used, if desired, and, in some configurations, no instrument mounting configuration is used at all.

With continued reference to FIG. 3, the illustrated hydraulic cylinder 16 comprises a cylinder tube 31, which preferably is closed at one end by the first mounting member 14, and a flow controller 33 provided in a piston 32 of the hydraulic cylinder 16. More preferably, the base 26 of the first mounting member 14 is inserted into the end of the cylinder tube 31 and is welded therein. This welding can be performed by the conventionally well-known projection method, wherein the base 26 is positioned in the opening of the cylinder tube 31 to provide a generally line contact between the cylinder tube 31 and the base 26. Projection welding is performed by pressing the base 26 and the cylinder tube 31 together in the axial direction and then applying a high tension current to them. Even if the cylinder tube 31 is tapered at its edge, the base 26 and the cylinder tube 31 will approximate a line contact with each other when they are positioned on approximately the same axis. Compared to seal-welding the two components together, manufacture of the cylinder tube 31 is simplified through the illustrated configuration, which results in a cost reduction as well as an improvement in external appearance.

With continued reference to FIG. 3, a rod guide 34 preferably closes the other end of the cylinder tube 31. The rod guide 34 supports the piston rod 18 such that the piston rod 18 can move in and out of the cylinder tube 31. In one embodiment, the rod guide 34 is inserted into the cylinder tube 31 and secured to the cylinder tube 31 using circlips 34a, 34b or the like. Other configurations also can be used. For instance, the rod guide 34 can be threaded into position within the cylinder tube 31.

Seal members 35, 36 are positioned at both ends of the illustrated rod guide 34. The seal members 35, 36 are used to seal around the piston rod 18. While two seal members are used in the illustrated configuration, a single seal, a single two-way seal or any other suitable sealing configuration can be used.

The piston 32 preferably is formed in a circular shape in section. More preferably, the piston 32 comprises a generally cylindrical shape so as to be fitted in the cylinder tube 31. The piston 32, in combination with the cylindrical tube 31, defines a first fluid chamber 37 and a second fluid chamber 38. Preferably, the piston 32 is secured to the piston rod 18 with a threaded member. Even more preferably, a nut secures the piston 32 to the piston rod 18.

With continued reference to FIG. 3, the first fluid chamber 37 preferably is defined between the piston 32 and a free piston 39, which is capable of movement within the cylinder tube 31. The free piston 39 separates the first fluid chamber 37 from a high pressure gas chamber 40. In other words, the high pressure gas chamber 40 preferably is positioned between an end portion of the cylinder tube 31 and the free piston 39. The high pressure gas chamber 40 can be filled with nitrogen gas at high pressure. Other fluids also can be used. As illustrated, a fitting or screw 41 is positioned in the base 26 of the mounting member 14, which forms a wall of the high pressure gas chamber 40. The screw can be used as a port for supplying nitrogen gas to the high pressure gas chamber 40. Preferably, a rubber or other resilient member is received by the screw 41, which resilient member can be used as a stopper.

As illustrated, a compression coil spring 42 biases the piston 32 toward a contracted position. The compression coil spring 42 preferably is positioned between the piston 32 and the rod guide 34. Advantageously, the compression coil spring 42 counteracts the gas reaction force exerted on the piston 32 by the working fluid in the cylinder tube 31. The gas reaction force is produced by the pressure receiving area of the piston 32 on the side of the second fluid chamber 38, which area is smaller than the area on the side of the first fluid chamber 37 due to the presence of the piston rod 18.

Because the working fluid in the first and second fluid chambers 37, 38 is pressurized by the high pressure nitrogen gas, the piston 32 receives a gas reaction force corresponding to the difference in pressure receiving areas and is biased toward the expansion direction by the gas reaction force. As used herein, the free length of the hydraulic damper 17 is a length of the damper 17 when the gas reaction force is counteracted by the spring force of the compression coil spring 42. The nitrogen gas pressure can be adjusted such that the free length corresponds with the distance between the mounting with the mounting seats 13. If the free length is appropriately set, the initial loading on the hydraulic damper 17 can be about zero. Thus, even if a small load is exerted on the hydraulic damper 17, the reinforcement device 12 quickly contracts in substantially immediate response to the load, which generates a damping force.

With continued reference to FIG. 3, the flow controller 33 provided on the piston 32 generally comprises the same structure as that used in a shock absorber for suspension devices or the like. The flow controller preferably is formed of first and second check valves 47, 48 that are provided with shims or disk springs 45, 46 that open and close respective ends of communication holes 43, 44 provided in the piston 32. Each of the disk springs 45, 46 preferably comprises a substantially annular shape and is formed of a stack of spring pieces on top of one another (i.e., a shim stack). More preferably, the inside circumferential surfaces of the disk springs are fixed to the piston 32. In the check valve 47, working fluid flows in one direction from the first fluid chamber 37 to the second fluid chamber 38 against the spring force of the disc spring 45, and in the check valve 48, working fluid flows in one direction from the second fluid chamber 38 to the first fluid chamber 37 against the spring force of the disc spring 46, whereby a damping force can be produced.

In the illustrated configuration, the extension rod 19 connects the end of the piston rod 18 and the other mounting member 15. Preferably, the extension rod 19 is formed by a pipe. Other suitable configurations also are possible. In the illustrated configuration, the extension rod 19 is threaded at one end onto the end of the piston rod 18 and welded at the other end to the other mounting member 15. More particularly, the illustrated connecting portion of the extension rod 19 and the piston rod 18 are configured such that a male threaded portion 18a formed on the piston rod 18 is received in a female threaded portion 19a of the extension rod 19. A lock nut 49 secures the two threaded portions 18a, 19a together. This threaded coupling also the free length of the reinforcement device 12 to be fine tuned once the nitrogen gas pressure provides a rough adjustment to the length.

With reference to FIG. 3, the threaded coupling preferably is covered by a protective boot 51. The protective boot 51 can be formed of rubber or any other suitable material. The protective boot also connects the extension rod 19 and the cylinder tube 31. The boot 51 advantageously reduces the likelihood of dust, dirt, muddy water or the like from sticking to the piston rod 18. In one configuration, the boot 51 comprises a generally conical configuration such that one end can be secured to the outer circumference of the cylinder tube 31 and the other end can be secured to the outside circumferential surface of the extension rod 19. Other configurations can be used keeping in mind the desire to shield the connection between the piston rod and the extension rod.

Welding of the extension rod 19 to the other mounting member 15 can be performed in any suitable manner. Preferably, the extension rod 19 is welded to the mounting member 15 by projection welding, which was discussed above. This welding can be performed by fitting the base 26 of the mounting member 15 to the end in the extension rod 19 such that the parts are brought together into line contact with each other. Once brought together, electric current flowing through the parts can be used to weld the extension rod 19 and the base 26 together with the two components being positioned generally along the same axis.

For the reinforcement device 12 described above to be mounted to the side frame rails 2 of the monocoque body 1, the mounting plates 21 of the mounting members 14, 15 are secured to the mounting seats 13 of the side frame rails 2 from below. The mounting plates 21 can be secured in position with the mounting bolts 24. The reinforcement device 12 can be easily installed and easily removed from the frame 1 using the mounting bolts 24 and the mounting members 14, 15, which connect to the side frame rails 2.

For the reinforcement device 12 to be mounted on the bumper reinforcement 5 of the frame 1, the mounting bolts 24 secure the mounting plates 21 of the mounting members 14, 15 to the mounting seats 13 of the frame 1. Preferably, the mounting plates are secured together with the bumper reinforcement 5. The reinforcement device 12 can be easily installed and easily removed from the mounting portions for the bumper reinforcement 5.

If a finished vehicle on which suspension devices or other similar parts have been installed is lifted by a jack or the like, for example, the reinforcement device 12 can be attached to or detached from the body from underneath the vehicle. If an under cover, such as a skid plate or a skin, is provided, then the under cover can be removed after the body is lifted by a jack or the like and the reinforcement device 12 then can be easily attached to or detached from below the vehicle. If a bumper (not shown) of a finished vehicle is removed, the reinforcement device 12 can be mounted to the mounting portions (on the mounting seats 13) for the bumper reinforcement 5. Without the bumper installed, the reinforcement device can be viewed outside of the body, together with the bumper reinforcement 5. Therefore, the reinforcement device 12 can easily be attached to or detached from the bumper reinforcement 5, with the bumper removed. Of course, it is possible to mount one, the other or both of the illustrated reinforcement devices 12, depending upon the desires of the vehicle owner.

Figure 4:
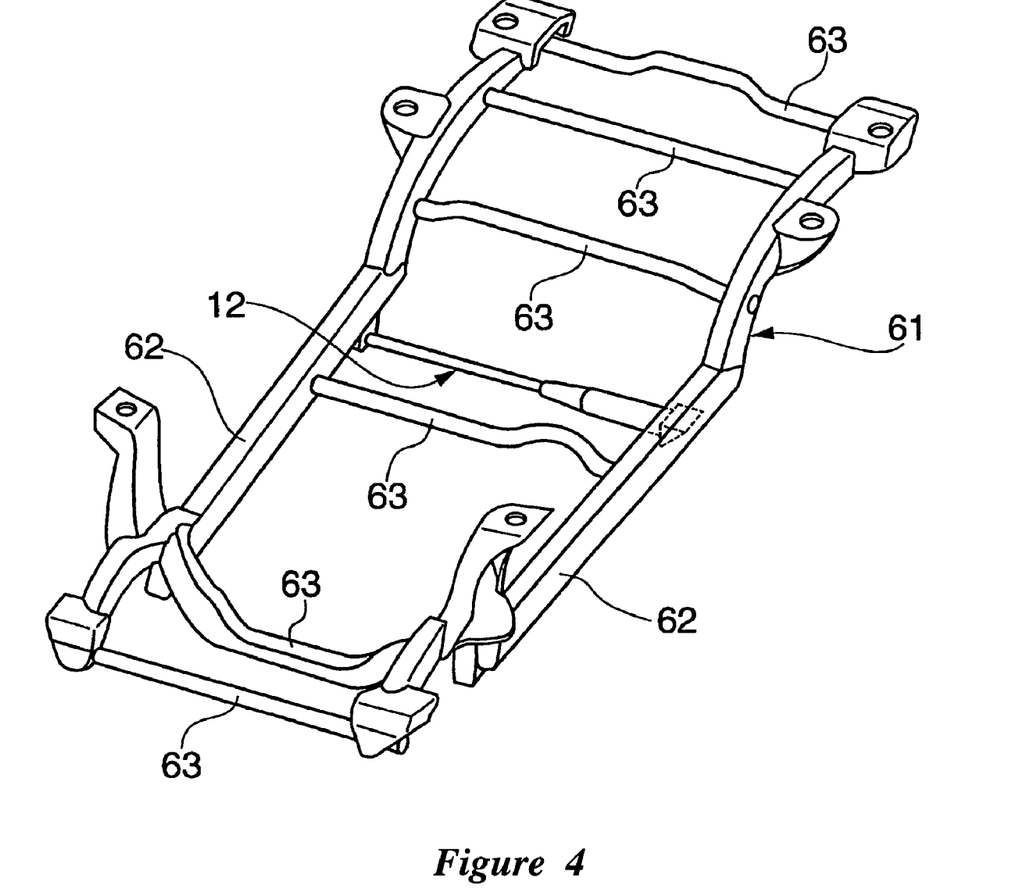
FIG. 4 is a perspective view showing another reinforcement device that is arranged and configured in accordance with certain features, aspects and advantages of the present invention.
Figure 5:
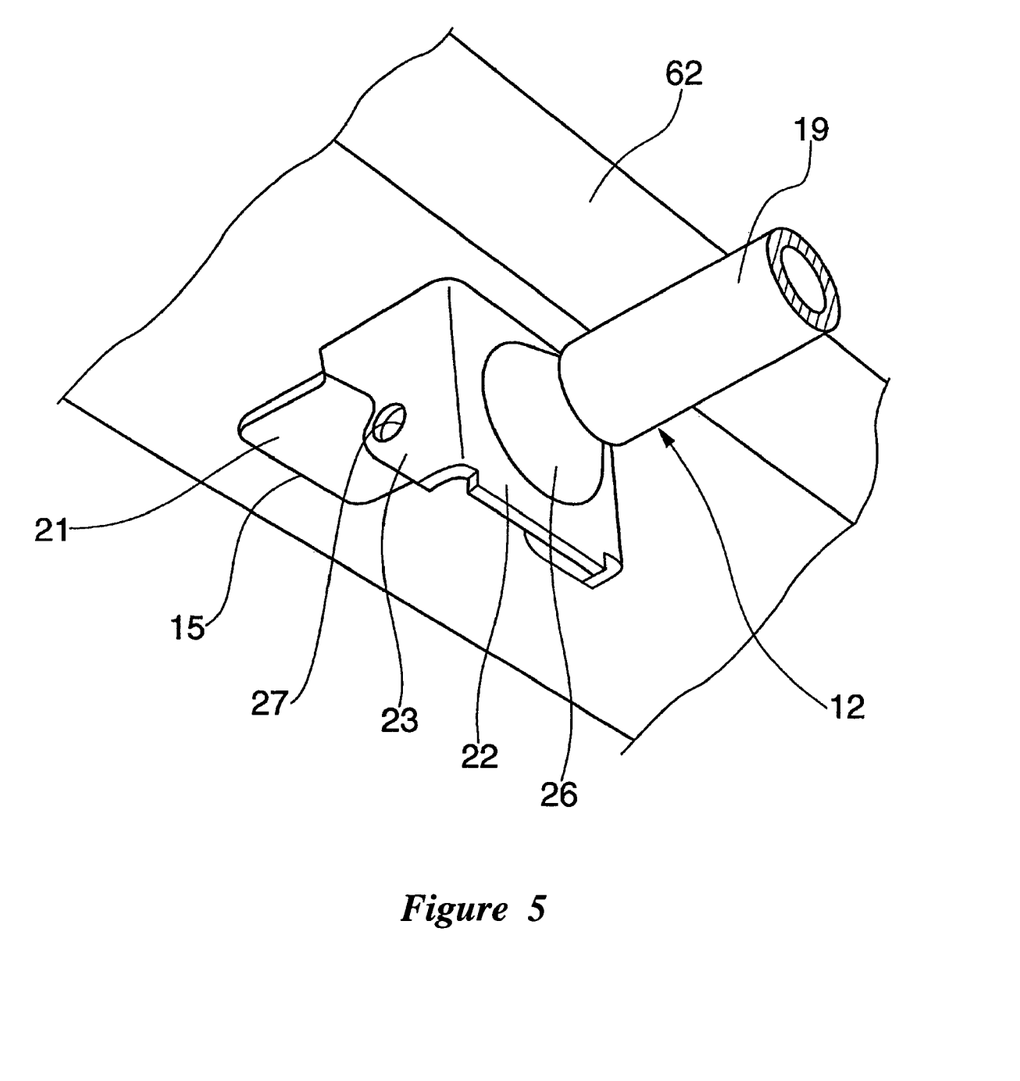
FIG. 5 is an enlarged perspective view of a mounting portion for the reinforcement device of FIG. 4.

With reference now to FIG. 4 and FIG. 5, another configuration arranged and configured in accordance with certain features, aspects and advantages of the present invention. In the illustrated configuration, a body frame 61 is of a conventionally well-known ladder type and comprises a pair of side frame rails 62 that extend generally longitudinally along the left and right sides with a plurality of cross members 63 extending transversely between the side frame rails 62.

Preferably, the reinforcement device 12 of this embodiment has the same structure as that of the embodiment shown in FIGS. 1 through 3. As shown in FIG. 5, the device 12 preferably extends in the lateral direction of the body and even more preferably is mounted such that it can be easily attached to and detached from the bottom surfaces (mounts) of the side frame rails 62.

Figure 6:
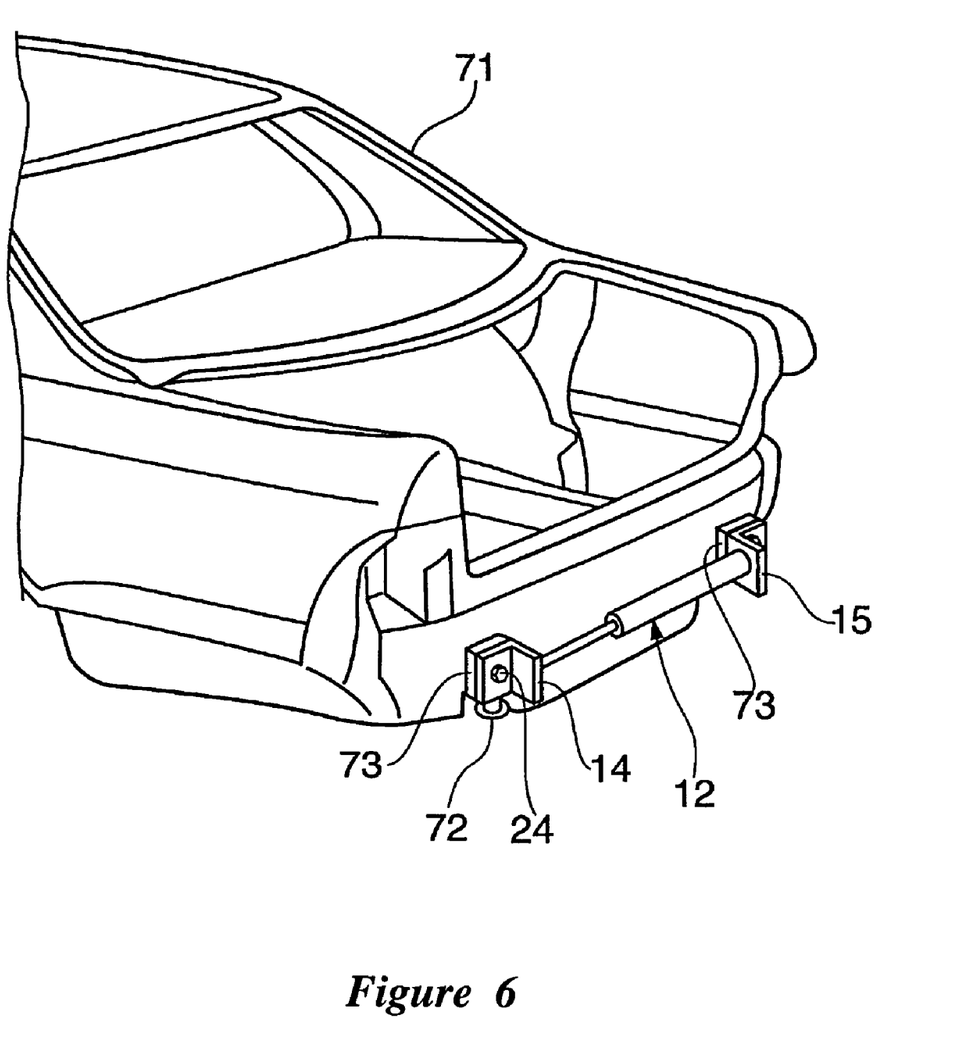
FIG. 6 is a perspective view of a further embodiment of the reinforcement device, which is mounted on tow hook supports of the vehicle, wherein the device is arranged and configured in accordance with certain features, aspects and advantages of the present invention.
Figure 7:
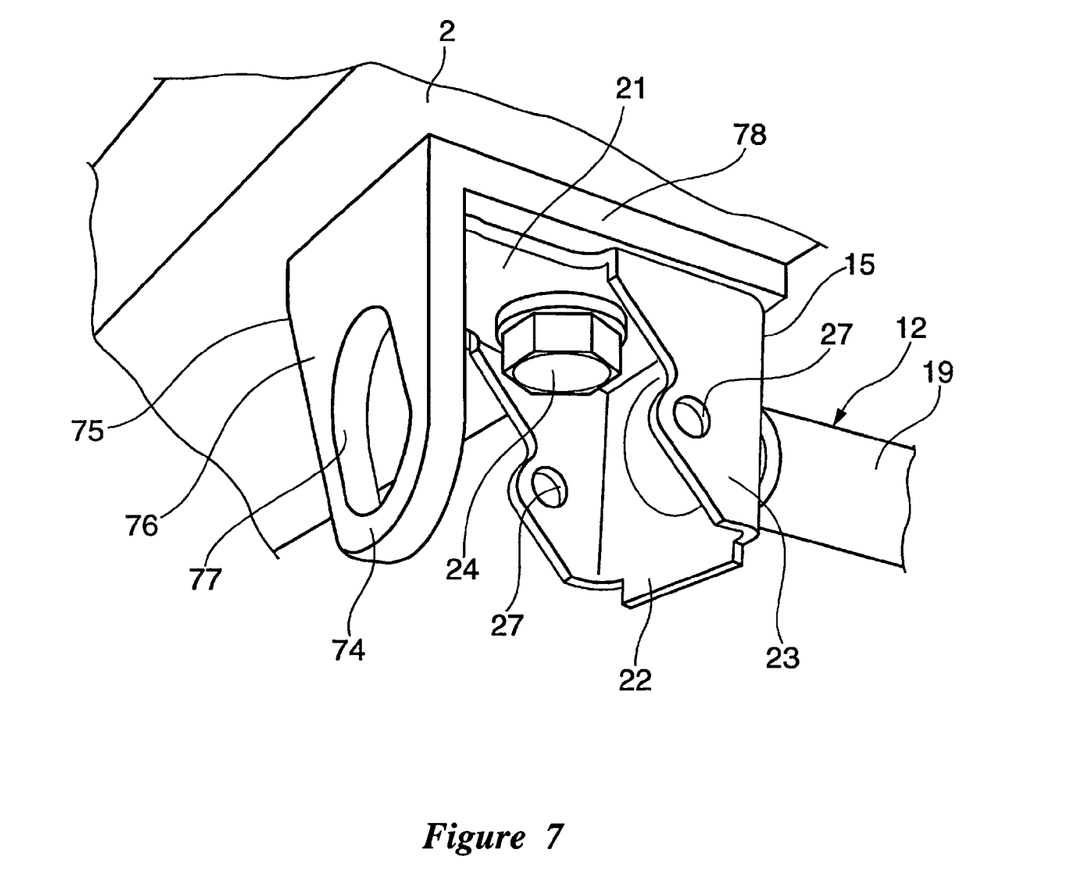
FIG. 7 is an enlarged perspective view of an arrangement similar to that of FIG. 6 but showing the device mounted on a bottom surface of tow hook supports.

With reference now to FIG. 6 and FIG. 7, a reinforcement device that is arranged and configured in accordance with certain features, aspects and advantages of the present invention is illustrated in conjunction with a tow hook mounting assembly. In particular, as illustrated, the reinforcement device can be mounted on rear faces (see FIG. 6) or bottom surfaces (see FIG. 7) of tow hook supports. In these figures, parts described in FIGS. 1-5 will be designated by the same reference numerals used in the earlier figures and detailed description of these parts will not be repeated unless such repetition would likely improve understanding of the disclosed construction.

With reference to FIG. 6, a car body 71 can be provided with tow hooks 72, as shown in FIG. 6. In the illustrated configuration, the tow hooks 72 are positioned on a rear end of the body 71 but the tow hooks 72 also can be positioned on a front end of the body 71 if desired. The tow hooks 72 can be formed, for example, by an eyebolt or a hook-shaped component. In one configuration, the tow hooks 72 are mounted to as a pair with one mounted to the left side frame rail and another mounted to the right side frame rail (not shown). In the illustrated configuration, two hook supports 73 are provided. The tow hook supports 73 preferably are mounted to the frame and, more preferably, are mounted to the side frame rails. Each tow hook 72 can be mounted to the associated tow hook support 73 in any suitable manner. Preferably, each two hook 72 depends downward from the tow hook support 73. The reinforcement device 12 shown in FIG. 6 can be removably mounted to the supports 73 such that it extends transversely across the vehicle between the pair of left and right tow hook supports 73.

With reference to FIG. 7, a tow hook 74 also can be formed by a steel plate 75. In the illustrated configuration, the tow hooks 74 are generally L-shaped in section and are provided with an elongated hole 77 that extends through the generally vertically and downwardly depending extension 76. The tow hook 74 can be removably mounted to the frame in any suitable manner. In the illustrated configuration, a generally horizontal portion 78 of the two hooks 74 is mounted on the bottom surface of the frame. In one preferred configuration, the generally horizontal portion 78 and the generally vertical portion 76 are integrally formed; however, other configurations also are possible. The mounting member 14, 15 of the reinforcement device 12 can be secured together with the tow hooks 74 to the frame assembly 1. In the illustrated configuration, a single fastener can be used to secure the tow hook 74 and the associated mounting member 14, 15 to the frame 1. By such a mounting arrangement, the reinforcement device 12 advantageously is mounted in a frame region that is most likely very sturdy and rigid, due to the connection of this region to the tow hooks. In some configurations, the reinforcement device 12 may be mounted to the body frame near a region where the tow hook supports 73 or plates 75 are mounted rather than being mounted with the tow hooks.

Figure 8:
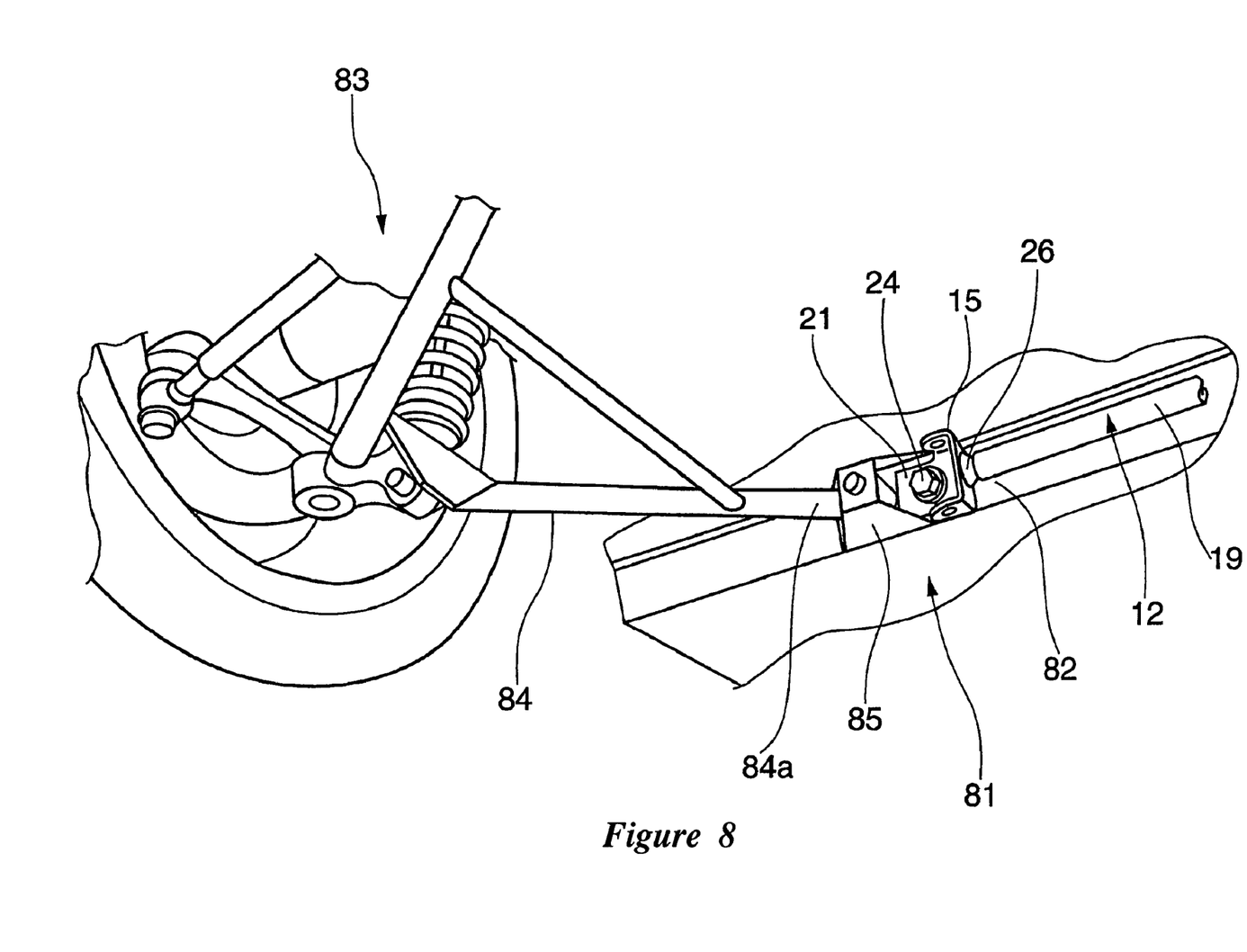
FIG. 8 is a perspective view of another embodiment of a reinforcement device arranged and configured in accordance with certain features, aspects and advantages of the present invention, wherein the device is mounted to a lower arm mount.

With reference now to FIG. 8, the reinforcement device 12 also can be removably mounted to a lower arm mounting portion of a vehicle's suspension device. As illustrated, a body frame 81 of a vehicle can be formed with a generally vertical wall 82 that extends across a portion of the body. In most configurations, the generally vertical wall 82 extends from one side to the other of the vehicle in the lateral direction. A bracket 85 is fixed to the vertical wall 82. In this manner, the bracket 85 can support one of two base ends, 84*a*, of a lower arm 84. The lower arm 84 forms a portion of a wheel suspension device 83 and assumes an "A" shape in plan view. While only one bracket 85 is shown, a second bracket would also be provided to support the other lower arm (not shown) in the lateral direction of the body. In other words, the generally vertical wall 82 comprises a mount (left and right-lower arm mounting portion) for the bracket 85 of the lower arm 84.

The reinforcement device 12 can be disposed between the pair of brackets 85 and can be removably mounted to the generally vertical wall 82. In some configurations, the reinforcement device can be connected to the generally vertical wall 82 adjacent to the brackets 85. In other configurations, the reinforcement device can be connected directly to the brackets 85. Thus, the reinforcement device 12 can improve the lateral rigidity of these portions of the body frame 81 on which lateral forces are exerted from the left and right lower arms while the vibration energy can be suppressed. Moreover, because the reinforcement device 12 uses the existing lower arm mount (e.g., the vertical wall 82), the device 12 can be easily mounted compared to requiring a special mount on the body frame.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A reinforcement device for a vehicle, the reinforcement device comprising:
   an elongated profile defined between a first end and a second end,
   a hydraulic damping force generation component positioned between the first end and the second end, the hydraulic damping force generation component resisting movement tending to separate or to bring together the first and second ends, the first end and the second end being adapted for removable mounting to an underside of the vehicle in a transverse orientation relative to the vehicle.

2. The reinforcement device of claim 1 in combination with a vehicle, the vehicle comprising a first side frame rail and a second side frame rail, the first end of the reinforcement device being directly mounted to the first side frame rail and the second end of the reinforcement device being mounted to the second side frame rail.

3. The reinforcement device and vehicle of claim 2, wherein the first end of the reinforcement device is mounted to a lower surface of the first side frame rail and the second end of the reinforcement device is directly mounted to a lower surface of the second side frame rail.

4. The reinforcement device and vehicle of claim 2, wherein the first side frame rail and the second side frame rail extend in a longitudinal direction of the vehicle and are spaced apart from each other in the transverse direction of the vehicle.

5. The reinforcement device of claim 1 in combination with a vehicle, the vehicle including a first lower-arm mounting portion of a suspension device and a second lower-arm mounting portion of the suspension device, the first end of the reinforcement device being mounted to the first lower-arm mounting portion and the second end of the reinforcement device being mounted to the second lower-arm mounting portion.

* * * * *